(12) United States Patent
Baba et al.

(10) Patent No.: US 10,012,975 B2
(45) Date of Patent: Jul. 3, 2018

(54) NUMERICAL CONTROL SYSTEM INCLUDING INTERNAL REGISTER SELF-RESET FUNCTION WITH SERIAL COMMUNICATION SIGNAL MONITORING

(71) Applicant: FANUC Corporation, Minamitsuru-gun, Yamanashi (JP)

(72) Inventors: Takahiro Baba, Minamitsuru-gun (JP); Kouji Hada, Minamitsuru-gun (JP); Yoshito Miyazaki, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 299 days.

(21) Appl. No.: 14/992,288

(22) Filed: Jan. 11, 2016

(65) Prior Publication Data

US 2016/0209827 A1    Jul. 21, 2016

(30) Foreign Application Priority Data

Jan. 16, 2015   (JP) .................................. 2015-006695

(51) Int. Cl.
*G05B 19/40*       (2006.01)
*G05B 19/402*      (2006.01)

(52) U.S. Cl.
CPC .. *G05B 19/402* (2013.01); *G05B 2219/34286* (2013.01)

(58) Field of Classification Search
None
See application file for complete search history.

(56) References Cited

U.S. PATENT DOCUMENTS 4,200,936 A * 4/1980 Borzcik ............. G05B 19/4147
                                                   375/222
4,639,889 A * 1/1987 Matsumoto ......... G06F 11/0757
                                                   235/379

(Continued)

FOREIGN PATENT DOCUMENTS

CN       101311856 A     11/2008
CN       103576613 A      2/2014

(Continued)

OTHER PUBLICATIONS

The Notification of the First Office Action dated Jul. 13, 2017 in Chinese Patent Application No. 2016100281663 (5 pages) with an English translation (7 pages).

(Continued)

*Primary Examiner* — Jason Lin
(74) *Attorney, Agent, or Firm* — Drinker Biddle & Reath LLP

(57) ABSTRACT

In a numerical control system including a numerical controller and a plurality of I/O units, a serial communication signal monitoring circuit is included inside the I/O unit to monitor a serial communication signal (data and an idle signal). When a state is detected in which a serial communication signal is high or low for a predetermined time or longer, the numerical control system acknowledges the state as disconnection of the serial communication signal, and generates a reset pulse signal to reset an internal register of the I/O unit. With this configuration, when the power supply of the numerical controller is turned off/on, it is unnecessary to turn off/on the power supply of the I/O unit.

4 Claims, 10 Drawing Sheets

(56) References Cited

U.S. PATENT DOCUMENTS

| | | | | |
|---|---|---|---|---|
| 5,822,615 | A | * | 10/1998 | Yamashita ......... G05B 19/0423 700/9 |
| 5,946,215 | A | * | 8/1999 | Mito ................. G05B 19/409 700/169 |
| 2008/0189445 | A1 | * | 8/2008 | Hada ................. G05B 19/042 710/10 |
| 2008/0294805 | A1 | | 11/2008 | Sone et al. |
| 2009/0051367 | A1 | * | 2/2009 | Hada ................. G05B 19/0425 324/537 |
| 2011/0119420 | A1 | * | 5/2011 | Hata .................. G03G 15/55 710/110 |
| 2014/0025185 | A1 | | 1/2014 | Miyazaki et al. |

FOREIGN PATENT DOCUMENTS

| | | |
|---|---|---|
| JP | H04-311123 A | 11/1992 |
| JP | H05-30119 A | 2/1993 |
| JP | H08-328636 A | 12/1996 |
| JP | H09-198119 A | 7/1997 |
| JP | 2002-014877 A | 1/2002 |
| JP | 2008-191989 A | 8/2008 |
| JP | 2009/053734 A | 3/2009 |
| JP | 2011-107845 A | 6/2011 |
| JP | 2014-191724 A | 10/2014 |

OTHER PUBLICATIONS

Notification of Reasons for Refusal dated Apr. 26, 2016 in Japanese Patent Application No. 2015-006695 (3 pages) with an English Translation (2 pages).

* cited by examiner

NUMERICAL CONTROL SYSTEM INCLUDING INTERNAL REGISTER SELF-RESET FUNCTION WITH SERIAL COMMUNICATION SIGNAL MONITORING

RELATED APPLICATION DATA

This application claims priority under 35 U.S.C. § 119 and/or § 365 to Japanese Application No. 2015-006695 filed Jan. 16, 2015, the entire contents is incorporated herein by reference.

BACKGROUND OF THE INVENTION

1. Field of the Invention

The present invention relates to a numerical control system in which a plurality of external signal input and output units (I/O units) are connected to perform input and output of an input signal/output signal (DI/DO signal) between a numerical controller and a machine tool.

2. Description of the Related Art

In a structure in which a plurality of external signal input and output units (I/O units) are connected to perform input and output of an input signal/output signal (DI/DO signal) between a numerical controller and a machine tool (daisy chain connection), the DI/DO signal communicated with the numerical controller varies depending on the configuration of the system, and when the DI/DO signal is captured, an address inside the numerical controller needs to be freely allocated to the DI/DO signal. For this reason, a method which will be described below is used.

<Method of Freely Allocating an External Signal (DI/DO signal) to an Address Inside a Numerical Controller>

FIG. 1 is a diagram illustrating a method of freely allocating an external signal (DI/DO signal) to an address inside a numerical controller in a system including the numerical controller and a plurality of I/O units connected to the numerical controller.

In a structure in which a plurality of external signal input and output units (I/O units) are connected to perform input and output of an input signal/output signal (DI/DO signal) between a numerical controller and a machine tool (not illustrated), the DI/DO signal communicated with the numerical controller varies depending on the configuration of the system, and when the DI/DO signal is captured, an address inside the numerical controller needs to be freely allocated to the DI/DO signal. For this reason, a method which will be described below is used.

1, 2, 3, . . . used in each diagram in the description below represent group IDs. The group IDs are numbers assigned to each of the I/O units in the order of closer positions to the numerical controller.

A, B, C, . . . represent information indicating the type of the units classified based on the number of signal points and functions thereof. For example, "A is a unit having 32 inputs and 24 outputs, and B is an analog input unit". I, II, III, . . . are not used actually but assigned for the sake of convenience to describe the present invention, as signs for uniquely identifying each of the units.

In FIG. 1, I/O units 1, 2, 3, 4, and 5 are connected to a numerical controller 6 via a signal line 7 using a daisy chain method. The method will be described below with which the numerical controller 6 assigns group IDs to each of the I/O units 1, 2, 3, 4, and 5 when the power supply is turned on, so that an address inside the numerical controller 6 is freely allocated to a DI/DO signal.

When the power supply of the numerical controller 6 is turned on, the numerical controller 6 firstly transmits a signal for setting that includes a group ID. Each of the units having received the signal, when the unit has not yet acquired the group ID thereof, acquires the transmitted group ID and returns information indicating the type of the I/O unit (A, B, C, . . . ) to the numerical controller 6. When the unit has already acquired the group ID thereof, the unit forwards the signal to an I/O unit connected in the lower order. FIG. 1 illustrates an example in which the group Ms of I/O units I to III (1 to 3) have been already set, and the group ID of IV will be set next.

All of the procedures described above are completed, and the numerical controller acknowledges the structure of the I/O units connected thereto. This is performed every time the power supply is turned on. With this process, an address inside the numerical controller can be freely allocated to a DI/DO signal (see Japanese Patent Application Laid-Open No. 2008-191989).

Japanese Patent Application Laid-Open No. 2009-53734 discloses a method with which an I/O unit at a front stage or the numerical controller detects disconnection of an I/O unit at a subsequent stage.

For the numerical controller to assign a group ID to an I/O unit every time, an internal register of the I/O unit storing therein information such as the group ID also needs to be reset every time. With a conventional method, a signal resetting an internal register of an I/O unit is input when the power supply is turned on. For this reason, when the power supply of the numerical controller is turned off/on, the I/O unit also needs to be turned off/on. Because the power supply is not turned off/on with respect to the I/O unit, when the internal register is not reset, group IDs are not correctly assigned and the numerical control system is not normally operated (see FIG. 2).

<Operation Performed when the Internal Register of the I/O unit is not Reset>

For the numerical controller to assign group IDs to the I/O units every time as in the method described above, the internal register of the I/O unit storing therein information such as the group ID needs to be reset every time.

An operation in a case where the internal registers of the I/O units are not reset and the numerical control system is not normally operated when only the power supply of the numerical controller is turned off/on is described below. FIG. 3 is a diagram illustrating an operation performed when an internal register of an I/O unit is not reset in a system including a numerical controller and a plurality of I/O units connected to the numerical controller.

With the conventional method described above with which a DI/DO signal is freely allocated to an address inside the numerical controller, when an I/O unit receives a signal for setting a group ID, the I/O unit acquires the group ID thereof and then forwards the signal to an I/O unit at a subsequent stage. At this point, an I/O unit the internal register of which is not reset and that has a group ID before the reset transmits the signal for setting a group ID to an I/O unit at a subsequent stage without acquiring any group ID for the ID itself. This causes a deviation in the setting of the group ID between the numerical controller and the I/O unit, leading to two kinds of situations described below.

(1) An I/O unit having an erroneously assigned group ID malfunctions (see FIG. 4).

(2) A plurality of I/O units having the same group ID transmit signals to the numerical controller, causing a malfunction in the system (see FIG. 5).

To prevent occurrence of the two problems (1) and (2), the internal registers of the I/O units have to be reset. With the conventional method, a signal resetting an internal register of an I/O unit is input when the power supply is turned on. For this reason, when the power supply of the numerical controller is turned off/on, the I/O unit also needs to be turned off/on. Furthermore, when the numerical controller and the I/O unit are apart from each other and need to have individual power supplies, the power-on timings thereof need to be matched using a relay or other device. This requires time and labor (FIG. 6).

As another method of resetting an internal register of an I/O unit, simultaneous transmission of a reset command is conceivable. However, this method also has a problem. Firstly, because many noises are generated in the FA environment, it is possible that signals cannot be correctly communicated with the noises added thereto. With the method with which a reset command is simultaneously transmitted, when noises are added to the reset command, a problem is caused that internal registers are not correctly reset and the system is not normally operated.

SUMMARY OF THE INVENTION

The object of the present invention is to provide a numerical control system including an internal register self-reset function using serial communication signal monitoring which enables reset of an internal register of an I/O unit without turning off/on the power supply of the I/O unit, in consideration of problems of the prior art techniques.

The numerical control system according to the present invention includes a numerical controller and one or more I/O units connected to the numerical controller and performs transmission and reception of input and output signals using serial communication between the numerical controller and the I/O unit. In this numerical control system, the I/O unit includes a monitoring part that monitors a serial communication signal transmitted from the numerical controller. The monitoring part includes a determining part and a reset signal output part. The determining part determines that the power supply of the numerical controller is stopped when the serial signal is stopped for a predetermined time or longer. The reset signal output part outputs a reset signal to a register inside the I/O unit when the determining part determines that the power supply of the numerical controller is stopped.

The determining part may be configured to set the predetermined time.

The reset signal output part may be configured to set the length of the output time of the reset signal.

The I/O unit may include a transmission and reception part and a stop part. The transmission and reception part receives the serial signal from the numerical controller or an I/O unit at a front stage and transmits the serial signal to an I/O unit at a subsequent stage. The stop part stops the serial signal to be transmitted to the I/O unit at a subsequent stage when the determining part determines that the power supply of the numerical controller is stopped.

In an I/O unit connected to a numerical controller using serial communication according to the present invention, the I/O unit includes a monitoring part that monitors a serial communication signal transmitted from the numerical controller. The monitoring part includes a determining part and a reset signal output part. The determining part determines that the power supply of the numerical controller is stopped when the serial signal is stopped for a predetermined time or longer. The reset signal output part outputs a reset signal to a register inside the I/O unit when the determining part determines that the power supply of the numerical controller is stopped.

The present invention can provide a numerical control system including an internal register self-reset function using serial communication signal monitoring which enables reset of an internal register of an I/O unit without turning off/on the power supply of the I/O unit.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

Figure 1:
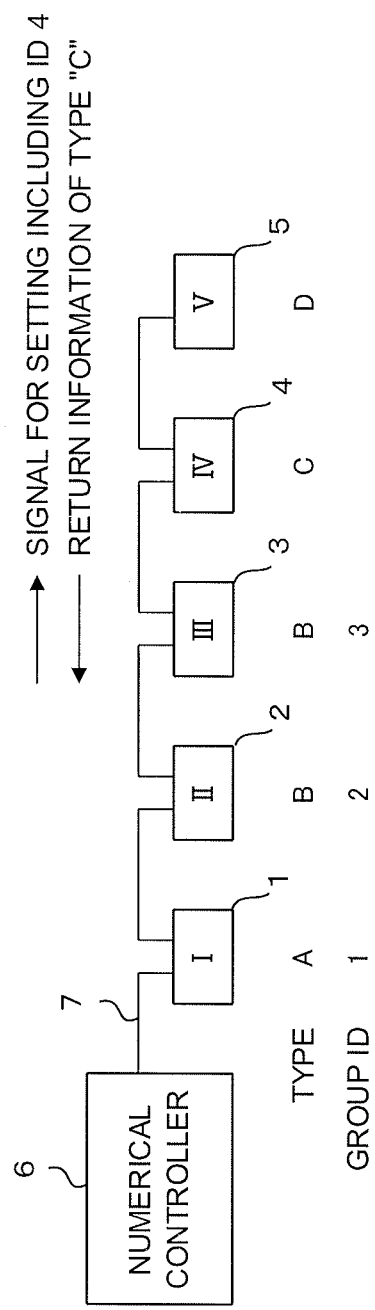
FIG. 1 is a diagram illustrating a method of freely allocating an external signal (DI/DO signal) to an address inside a numerical controller in a system including the numerical controller and a plurality of I/O units connected to the numerical controller.
Figure 2:
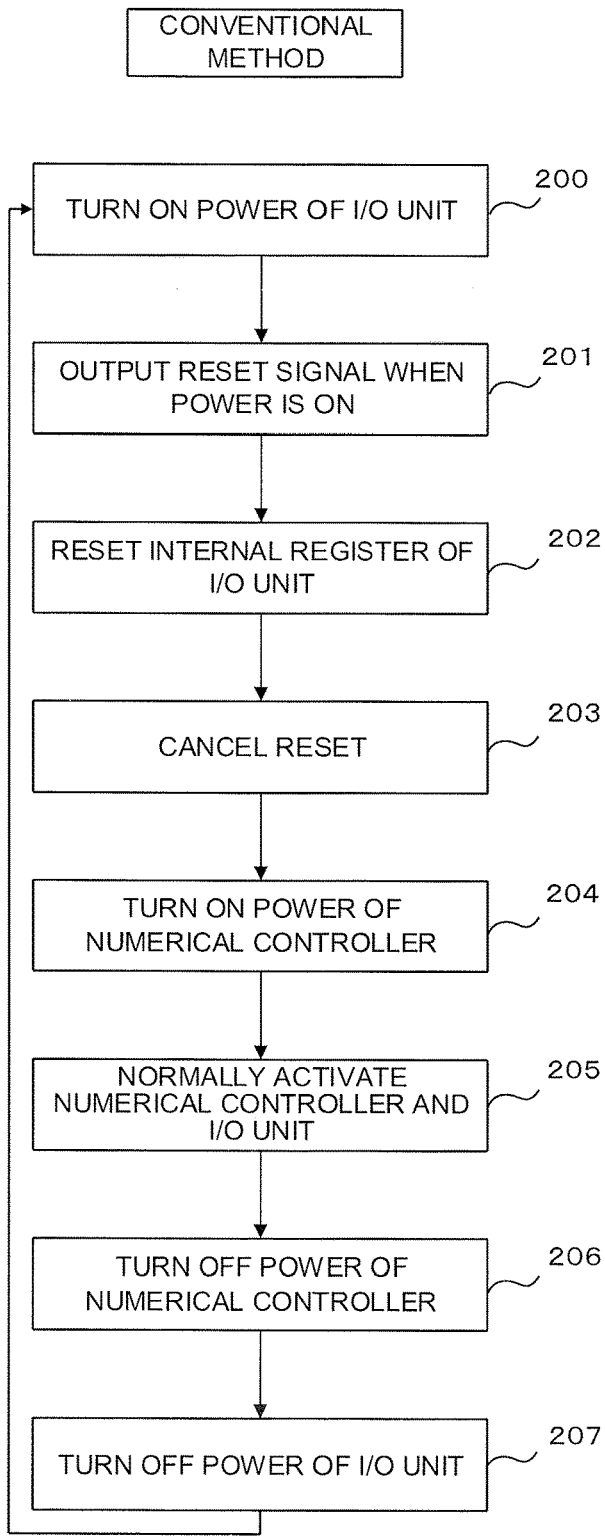
FIG. 2 is a diagram illustrating a flow of a conventional method of resetting an internal register.
Figure 3:
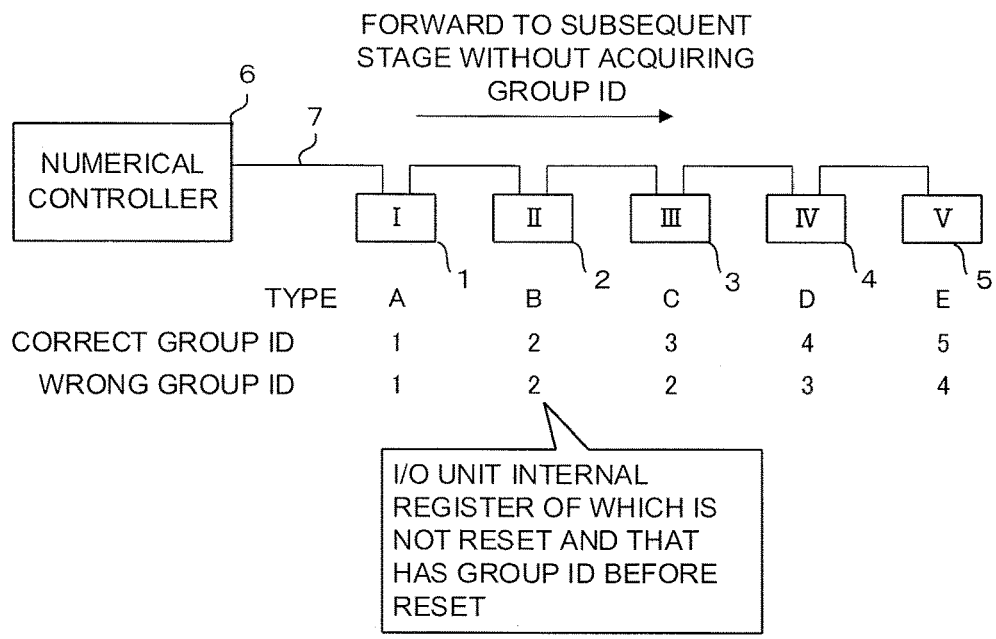
FIG. 3 is a diagram illustrating an operation performed when an internal register of an I/O unit is not reset in a system including a numerical controller and a plurality of I/O units connected to the numerical controller.
Figure 4:
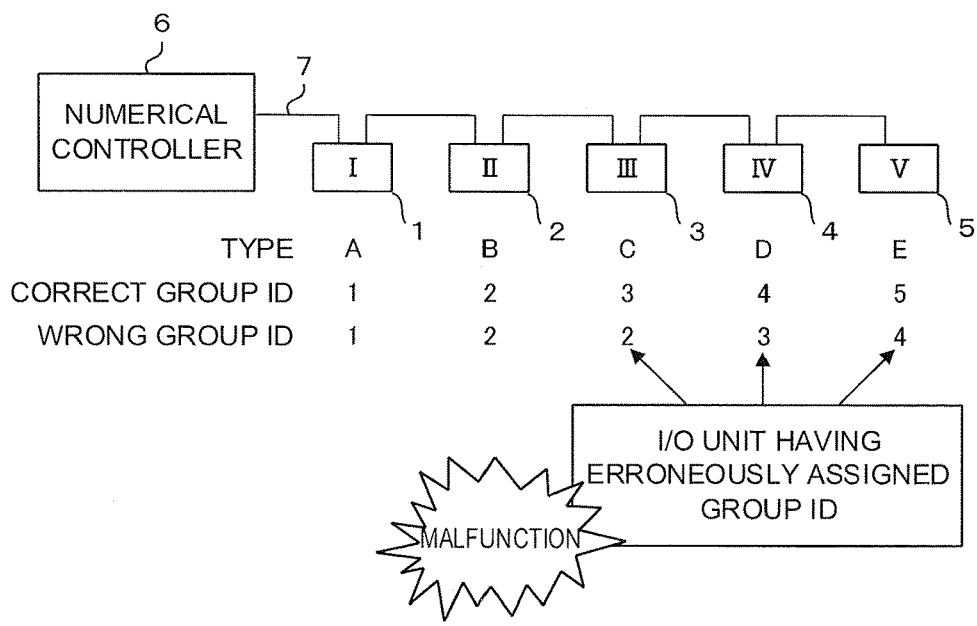
FIG. 4 is a diagram illustrating a problem caused when the internal register of an I/O unit is not reset.
Figure 5:
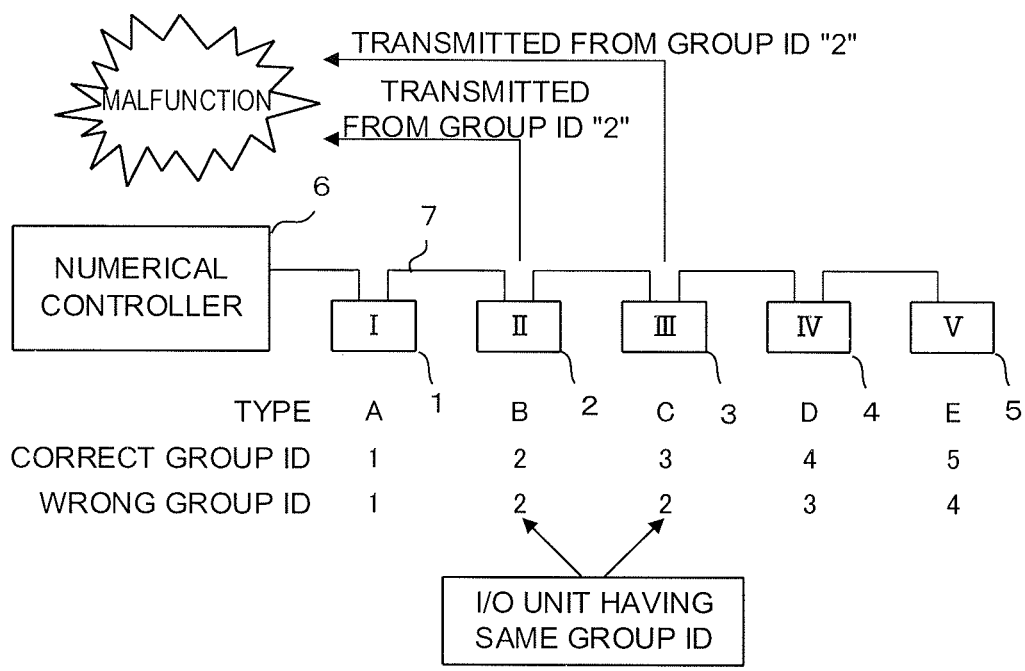
FIG. 5 is a diagram illustrating another problem caused when the internal register of an I/O unit is not reset.

Embodiments of the present invention will be described below with reference to the drawings. A configuration similar to or the same as that in a prior art technique will be described using the same reference numeral. The present invention is not to monitor a certain pattern of outputs but to monitor a stop for a predetermined time or longer of a serial communication signal. For this reason, when a numerical controller is turned off, an internal register thereof is always reset. Furthermore, it is unconceivable that the serial communication signal is fixed to a high level or a low level due to a noise added. Unintended reset of the internal register is thus impossible. The present invention relates to a numerical control system in which an I/O unit at a subsequent stage detects disconnection (stop of a serial communication signal for a predetermined time or longer) of an I/O unit at a front stage or the numerical controller using this idle signal.

1. Method of monitoring a serial communication signal in a serial communication signal monitoring circuit and generating a reset signal:

A system according to the present invention monitors a serial communication signal in a serial communication signal monitoring circuit and generates a reset signal, thereby solving the task of the present invention. Similarly to the system illustrated in FIG. 1 described above, a plurality of I/O units are connected to a numerical controller 6 via a signal line 7 by a daisy chain method.

The numerical controller 6 and I/O units 1, 2, 3, 4, and 5 perform transmission and reception of DI/DO signals at a predetermined cycle. When the transmission and reception of DI/DO signals are not performed, a signal (idle signal) repeating modulation/demodulation at a certain cycle is input and output. For this reason, a DI/DO signal cannot be fixed to a high level or a low level for a predetermined time or longer during which the signal is transmitted as a piece of data.

Figure 7:
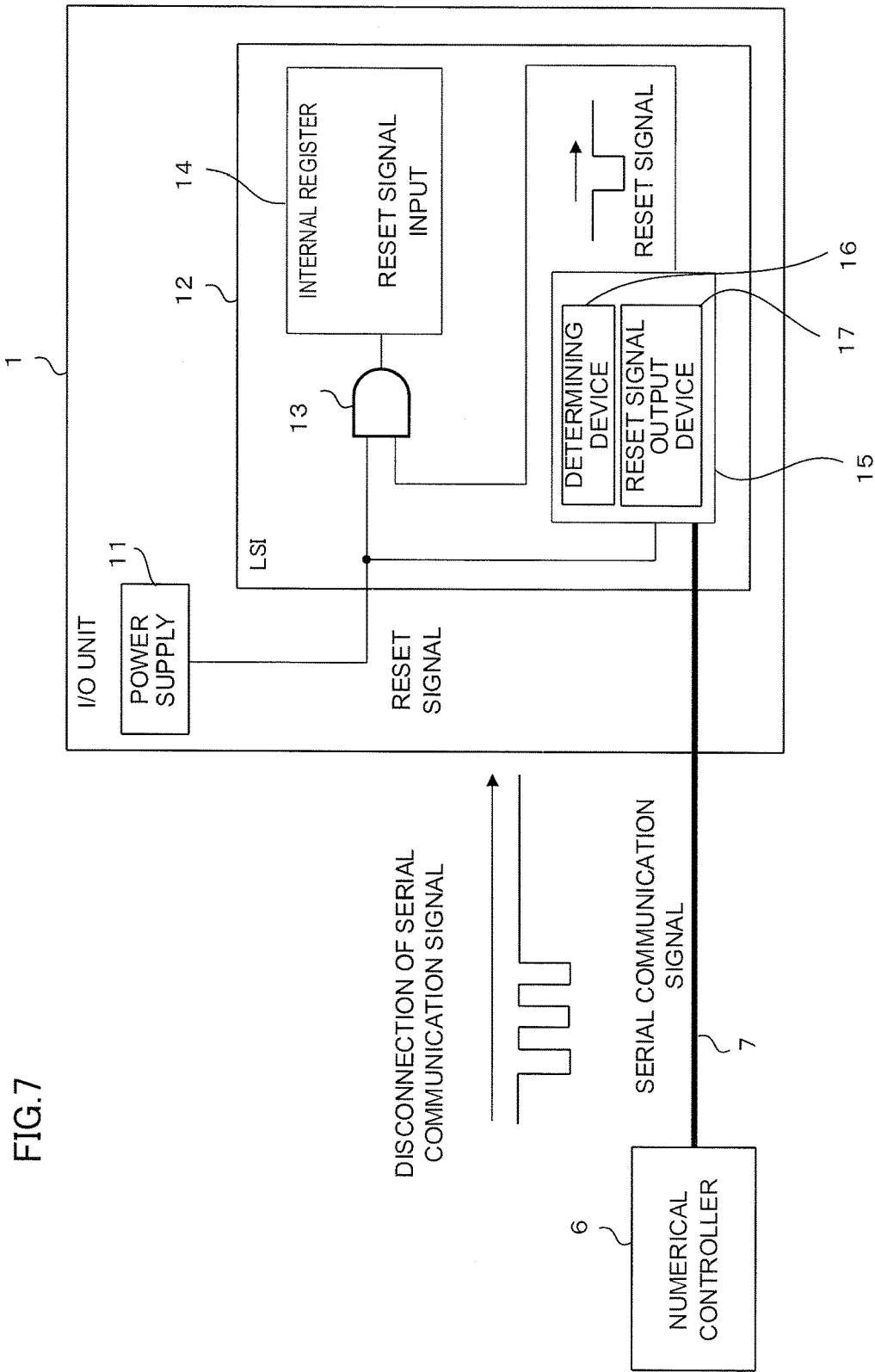
FIG. 7 is a diagram illustrating a method of monitoring a serial communication signal in a serial communication signal monitoring circuit according to the present invention and generating a reset signal.

The I/O unit used in the system according to the present invention includes a power supply 11 and an LSI 12, as illustrated in FIG. 7. Each of the I/O units 1, 2, 3, 4, and 5 has a serial communication signal monitoring circuit 15 inside thereof and monitors data and idle signals, that is, serial communication signals.

When a determining device 16 detects a state in which a serial communication signal is high or low for a predetermined time or longer, the serial communication signal monitoring circuit 15 acknowledges the state as disconnection of the serial communication signal, and the reset signal output device 17 generates a reset pulse signal to reset an internal register 14 of the I/O unit. With this configuration, when the power supply of the numerical controller 6 is turned off/on, it is unnecessary to turn off/on the power supply of the I/O unit.

Figure 8:
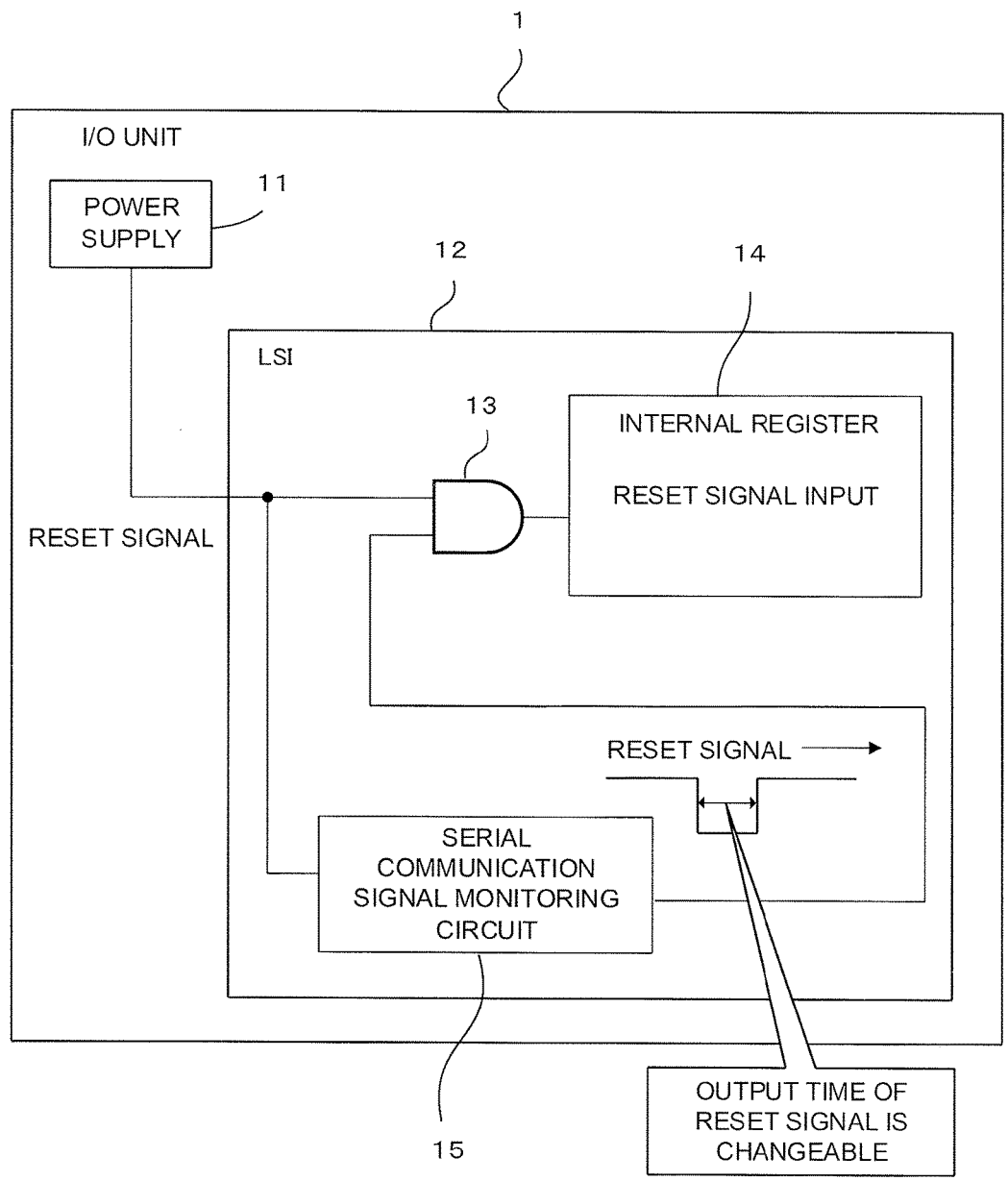
FIG. 8 is a diagram illustrating a method of monitoring a serial communication signal in a serial communication signal monitoring circuit according to the present invention and generating a reset signal.

Furthermore, the reset signal output device 17 of the serial communication signal monitoring circuit 15 can set a length of an output time of an output reset signal (see FIG. 8).

The I/O unit further includes an AND circuit 13 in which a reset signal from the power supply 11 of the I/O unit 1 or a reset signal from the serial communication signal monitoring circuit 15 is input to the internal register 14 as a reset signal.

With this configuration, when the power supply of the numerical controller 6 in the numerical control system is turned off/on, the length of the output time of the output reset signal can be changed in accordance with the time required for setting the internal register 14 when the power supply is turned ON again after the internal register 14 is reset when the power supply is turned off.

Turning off to turning on of the power supply of the numerical controller 6 consisting of the numerical control system in a short time can be realized by shortening the length of the output time of the output reset signal. It is also conceivable that the reset signal is hard to be transmitted due to noises flowing in from outside, for example. However, setting the output time of the output reset signal long can ensure reset of the internal register because noises are added in a short time.

Figure 9:
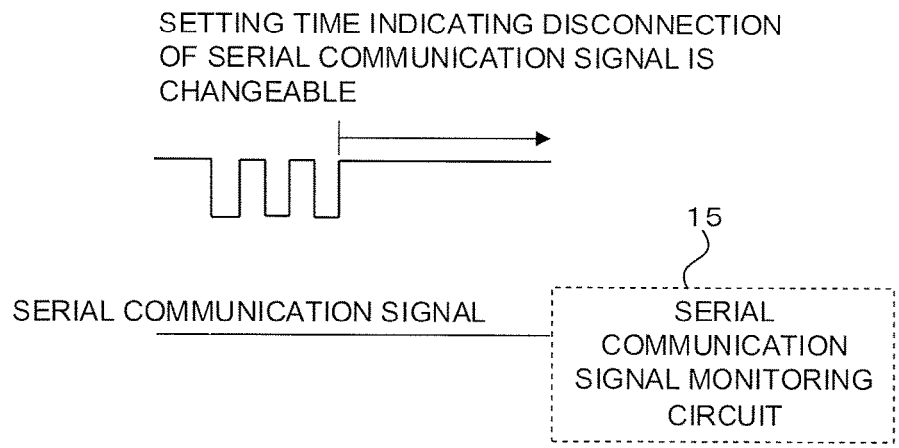
FIG. 9 is a diagram illustrating a method of monitoring a serial communication signal in a serial communication signal monitoring circuit according to the present invention and generating a reset signal.

Furthermore, in the serial communication signal monitoring circuit 15, the predetermined time regarded as disconnection of the serial communication signal can be set (see FIG. 9). This can deal with a case where a time length for which the data transmitted from the numerical controller 6 is fixed to a high level or a low level for the predetermined time or longer is changed.

Figure 6:
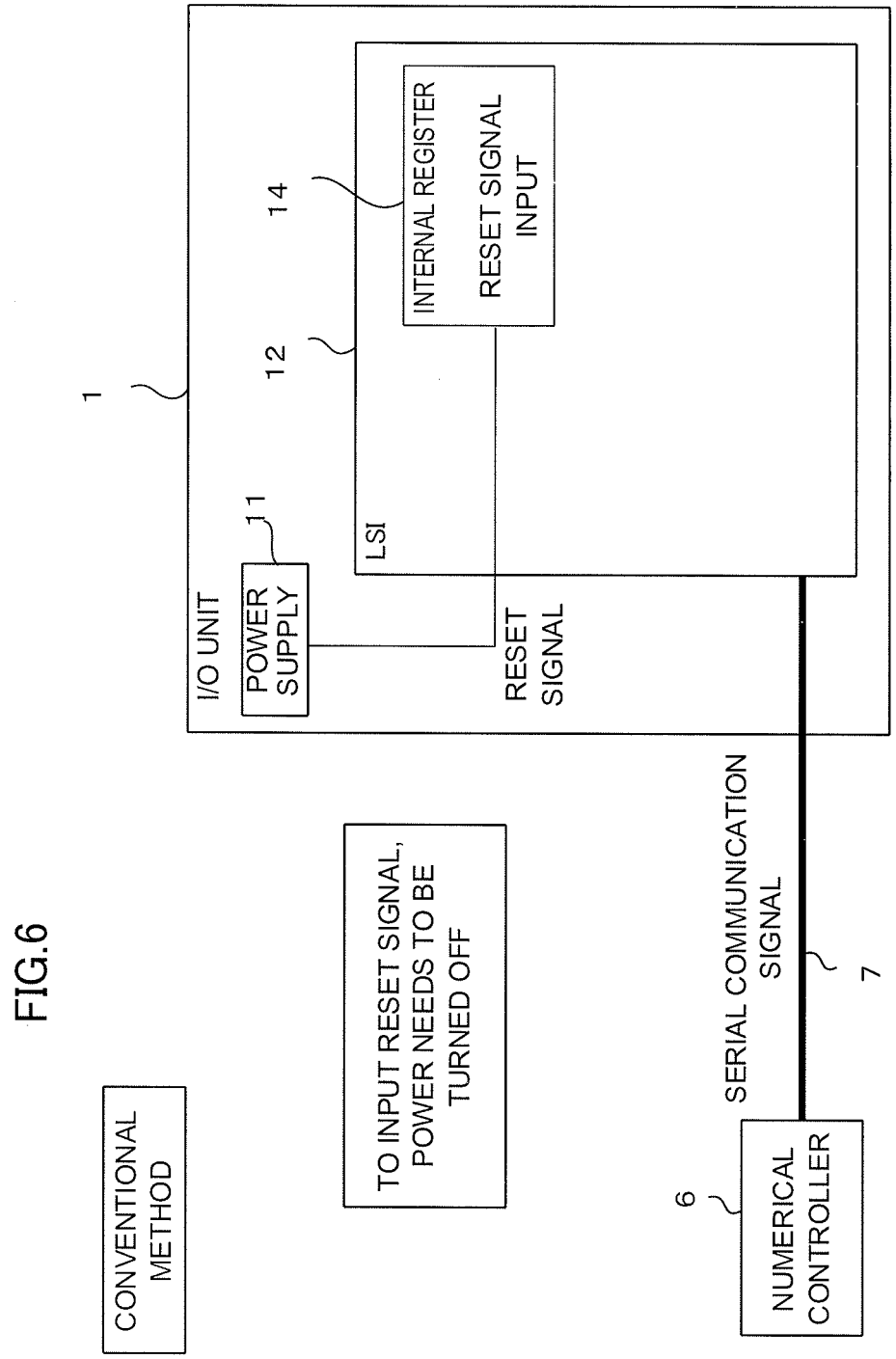
FIG. 6 is a diagram illustrating a conventional reset method.

With the conventional method, as described above, when the power supply of the I/O unit 1 is turned on, reset signal is input to reset the internal register 14, and thereafter the reset is cancelled. For this reason, when the power supply of the numerical controller 6 is turned off/on, the power supply of the I/O unit 1 needs to be turned off/on. With this configuration, when the numerical controller 6 and the I/O unit 1 are apart from each other and need to have individual power supplies, the power-on timings thereof need to be matched using a relay or other device (see FIG. 6). By contrast, using the system according to the present invention, when the power supply of the numerical controller 6 is turned off/on, it is unnecessary to turn off/on the power supply of the I/O unit 1, whereby no relay or other device is necessary for matching the power-on timings.

Figure 10:
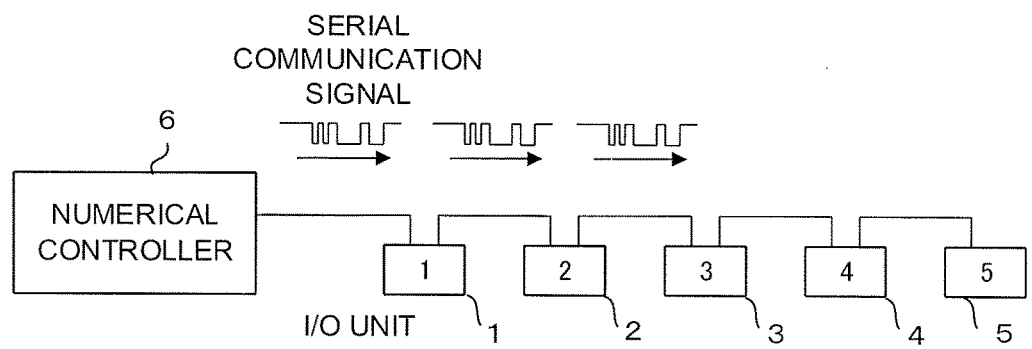
FIG. 10 is a diagram illustrating a flow of a signal from a numerical controller to a plurality of stages of I/O units when a plurality of stages of I/O units are connected to the numerical controller.
Figure 11:
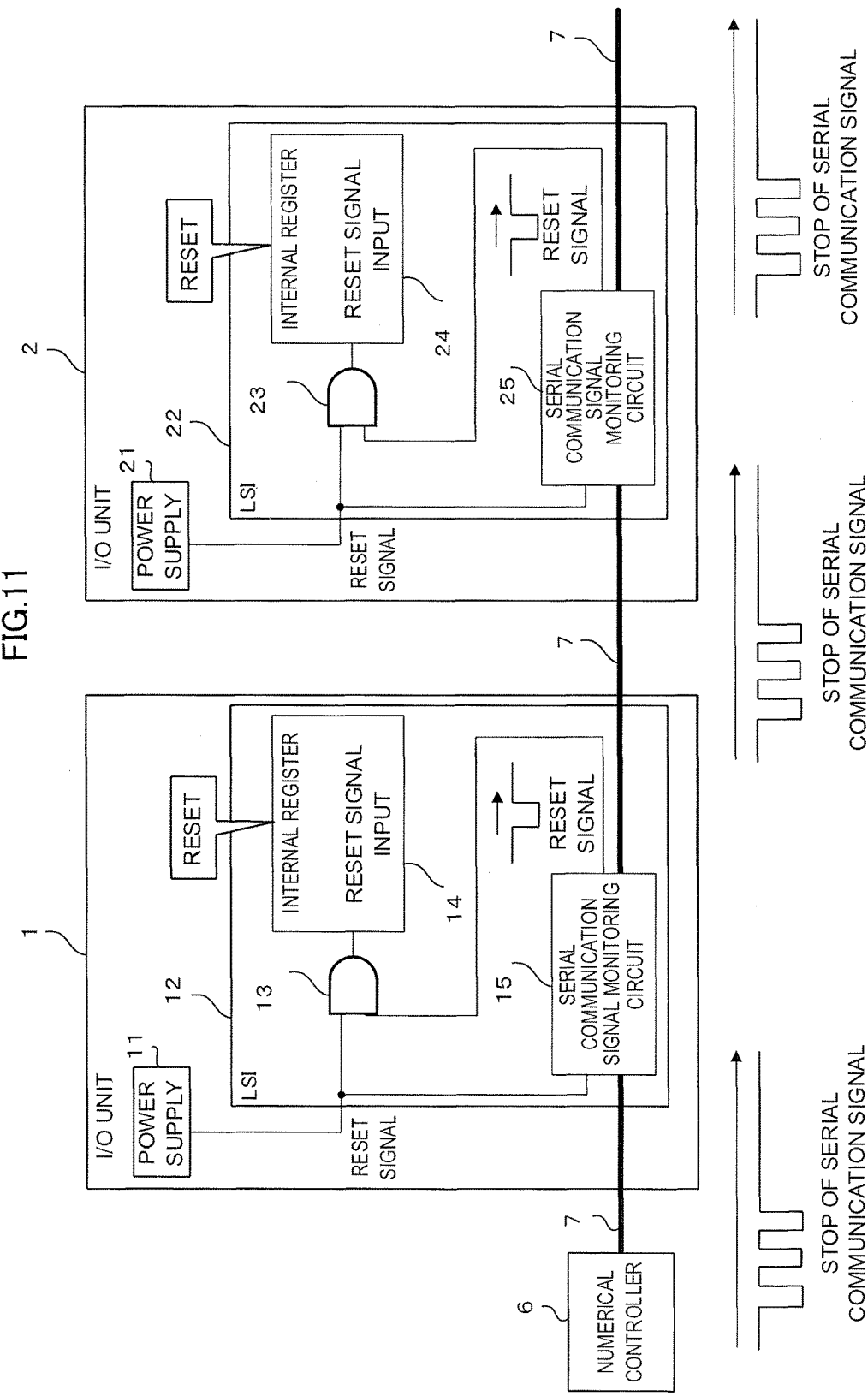
FIG. 11 is a diagram illustrating that when the power supply of the numerical controller is stopped, a serial signal transmitted to an I/O unit at a subsequent stage is stopped.

2. Method with which the I/O unit transmits a serial signal from an I/O unit at a front stage to an I/O unit at a subsequent stage, monitors a stop of a serial signal from the I/O unit at a front stage, and outputs a reset signal to a register inside the I/O unit:

FIG. 10 is a diagram illustrating a flow of a serial signal from a numerical controller to a plurality of stages of I/O units when a plurality of stages of I/O units are connected to the numerical controller. FIG. 11 is a diagram illustrating that when the power supply of the numerical controller is stopped, a serial signal to be transmitted to an I/O unit at a subsequent stage is stopped.

As illustrated in FIG. 10, when a plurality of stages of I/O units 1, 2, 3, 4, and 5 are connected to the numerical controller 6 via the signal line 7, the serial signal that has been transmitted to the I/O unit 1 from the numerical controller 6 is further transmitted to the I/O unit 2 connected to the I/O unit 1 at a subsequent stage.

The I/O unit 1 includes a device that receives a serial signal from the numerical controller 6 (or from an I/O unit at a front stage, if any) and transmits the serial signal to the I/O unit 2 at a subsequent stage. The determining device 16 includes a device that stops transmission of the serial signal to the I/O unit at a subsequent stage when the power supply of the numerical controller 6 is determined to be stopped.

Each of the I/O units stops transmission of the serial signal to the I/O unit at a subsequent stage when the determining device 16 determines that the power supply of the numerical controller 6 is stopped. This determining device 16 determines that the power supply of the numerical controller 6 is stopped when a serial signal in a monitoring device (serial communication signal monitoring circuit 15) that monitors serial signals transmitted from the numerical controller 6 has been stopped for a predetermined time or longer. The I/O unit at a subsequent stage outputs a reset signal to the register inside the I/O unit due to the stop of the serial signal from the I/O unit at a front stage.

With the conventional method, when the numerical controller and the I/O unit are apart from each other and need to have individual power supplies, the power-on timings thereof need to be matched using a relay or other device. Especially when a plurality of I/O units are used as described above, for example, many relays are used. Because such relays are generally consumables, it is undesirable that many relays are used, from a reliability point of view. Furthermore, increasing the number of relays increases the installation spaces and installation manhours and so is undesirable. According to the present invention, no relay is necessary, whereby all the above-described problems can be solved.

Figure 12:
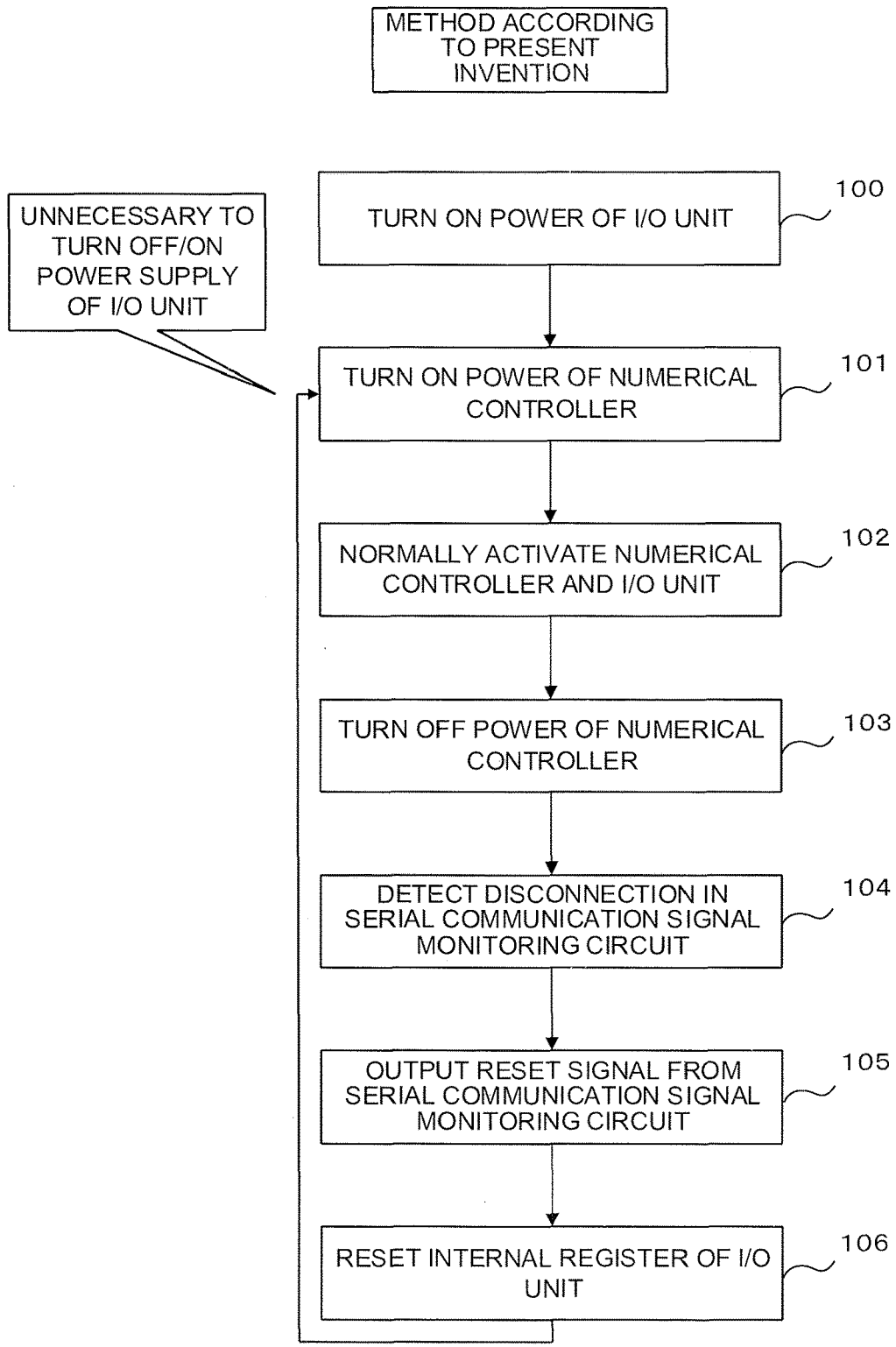
FIG. 12 is a diagram illustrating a flow of resetting an internal register according to the present invention.

FIG. 12 is a diagram illustrating a flow of resetting an internal register of the I/O unit.

According to the present invention, disconnection of a serial communication signal to the I/O unit is detected by the serial communication signal monitoring circuit, a reset signal is output, and the internal register is reset. With this configuration, it is unnecessary to turn off/on the power supply of the I/O unit. With the conventional method, when the power supply of the I/O unit is turned on, reset signal is input to reset the internal register, and thereafter the reset is cancelled. For this reason, the power supply of the I/O unit needs to be turned off/on.

The difference between a watchdog function and the present invention will now be described.

When a watchdog function (see Japanese Patent Application Laid-Open No. 2011-107845) is used, a certain signal is output from a numerical controller periodically, and the signal is checked on the I/O unit side. When the signal cannot be checked, it is determined that normal operation is not performed. In other words, with the watchdog function, a certain signal needs to be output periodically. However, according to the present invention, no monitoring signal needs to be output anew because it is checked if a serial communication signal changes. When no watchdog data has been received for a predetermined time or longer, a slave considers this as a communication error. At this time, the slave performs reset on itself to return to the state at the time when the power supply is turned on.

By contrast, according to the present invention, when no DO data has been received for a predetermined time or longer, a slave considers this as a communication error. At this time, the slave is in a state of detecting a watchdog alarm. However, the slave does not perform reset on itself. On the other hand, when no idle signal has been received for a predetermined time or longer, the slave considers this as the stop of the power supply of the master. At this time, the slave performs reset on itself to return to the state at the time when the power supply is turned on.

In short, according to the prior art technique,
"stop of watchdog data" is equal to "communication error or stop of the power supply of the master"
whereas, according to the present invention,
"stop of watchdog data" is equal to "communication error",
"stop of an idle signal" is equal to "stop of the power supply of the master".

This difference indicates that the present invention distinguishes a communication error and the stop of the power supply of the master. With this difference, advantages described below can be achieved, which cannot be achieved by the prior art technique.

The state in which a watchdog alarm is generated can be retained in the slave and notified to the user with an LED or the like. With the prior art technique, the slave performs reset on itself, and cannot display the alarm state with an LED or the like.

Even after the generation of the watchdog alarm, communication such as an alarm search can be performed as necessary to check the state of the slave and the DI. With the prior art technique, the slave performs reset on itself. This clears out the internal register of the slave, which is required for the alarm search communication, and the alarm search communication cannot be performed.

The invention claimed is:

1. A numerical control system comprising:
a numerical controller; and
one or more I/O units connected to the numerical controller, the numerical control system performing transmission and reception of input and output signals using serial communication between the numerical controller and a first I/O unit, wherein
the first I/O unit includes a monitoring part that monitors a serial communication signal transmitted from the numerical controller,
the monitoring part includes circuitry including
a transmission and reception part that receives the serial signal from the numerical controller or a second I/O unit at a front stage relative to the first I/O unit and transmits the serial signal to a third I/O unit at a subsequent stage relative to the first I/O unit,
a determining part that determines that a power supply of the numerical controller is stopped when the serial signal is stopped for a predetermined time or longer,
a stop part that stops the serial signal to be transmitted to the first I/O unit at a subsequent stage when the determining part determines that the power supply of the numerical controller is stopped, and
a reset signal output part that outputs a reset signal to a register inside the first I/O unit when the determining part determines that the power supply of the numerical controller is stopped, wherein the register inside the first I/O unit is reset based on the reset signal.

2. The numerical control system according to claim 1, wherein the determining part is configured to set the predetermined time.

3. The numerical control system according to claim 1, wherein the reset signal output part is configured to set the length of the output time of the reset signal.

4. An I/O unit connected to a numerical controller using serial communication, comprising:
a monitoring part that monitors a serial communication signal transmitted from the numerical controller, wherein
the monitoring part includes circuitry including
a transmission and reception part that receives the serial signal from the numerical controller or a second I/O unit at a front stage relative to the I/O unit and transmits the serial signal to a third I/O unit at a subsequent stage relative to the I/O unit,
a determining part that determines that a power supply of the numerical controller is stopped when the serial signal is stopped for a predetermined time or longer,
a stop part that stops the serial signal to be transmitted to the I/O unit at a subsequent stage when the determining part determines that the power supply of the numerical controller is stopped, and
a reset signal output part that outputs a reset signal to a register inside the I/O unit when the determining part determines that the power supply of the numerical controller is stopped, wherein the register inside the I/O unit is reset based on the reset signal.

* * * * *